United States Patent [19]

Brooks et al.

[11] 4,275,978
[45] Jun. 30, 1981

[54] TRANSPORT APPARATUS

[76] Inventors: Norman B. Brooks, 391 East St., Carlisle, Mass. 01741; Frank P. Brooks, 5 Inverness Rd., Winchester, Mass. 01890

[21] Appl. No.: 12,354

[22] Filed: Feb. 15, 1979

[51] Int. Cl.³ .................... B65G 25/02; B65G 27/08
[52] U.S. Cl. .................... 414/156; 198/763; 198/775; 414/217
[58] Field of Search ............... 414/156, 217; 198/763, 198/766, 774–776; 432/126, 239

[56] References Cited

U.S. PATENT DOCUMENTS

| | | | |
|---|---|---|---|
| 2,705,070 | 3/1955 | Carrier et al. | 198/763 |
| 2,951,581 | 9/1960 | Long et al. | 198/763 |
| 3,973,665 | 8/1976 | Giammanco | 198/775 |

*Primary Examiner*—Robert G. Sheridan
*Attorney, Agent, or Firm*—Cesari and McKenna

[57] ABSTRACT

Compact, lightweight transport apparatus for use particularly in hostile environments employs a plurality of groups of rails flexurally mounted to a base and corresponding groups of slats flexurally mounted to the rails and forming a slat array. Corresponding groups of slats and rails are reciprocated out of phase so that the slat group orbits relative to the base along an orbital path. The different slat-rail groups are also reciprocated out of phase with one another so that an object placed on the slat array is advanced incrementally along the slat array in a very gentle fashion.

25 Claims, 13 Drawing Figures

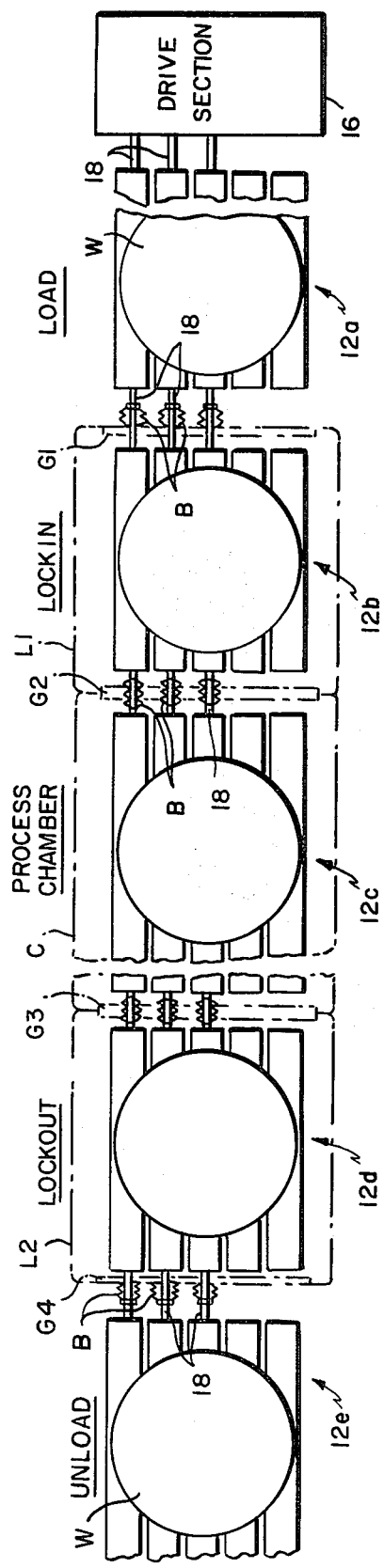
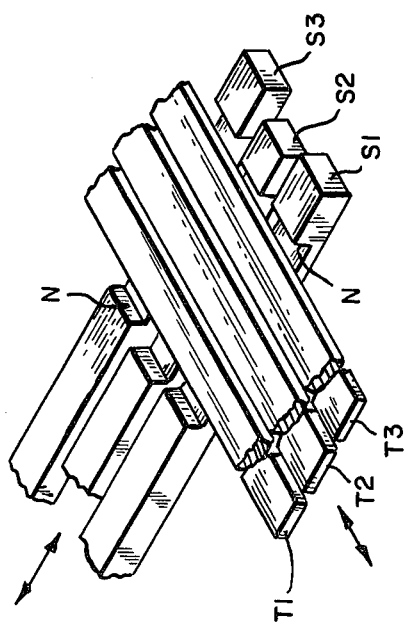

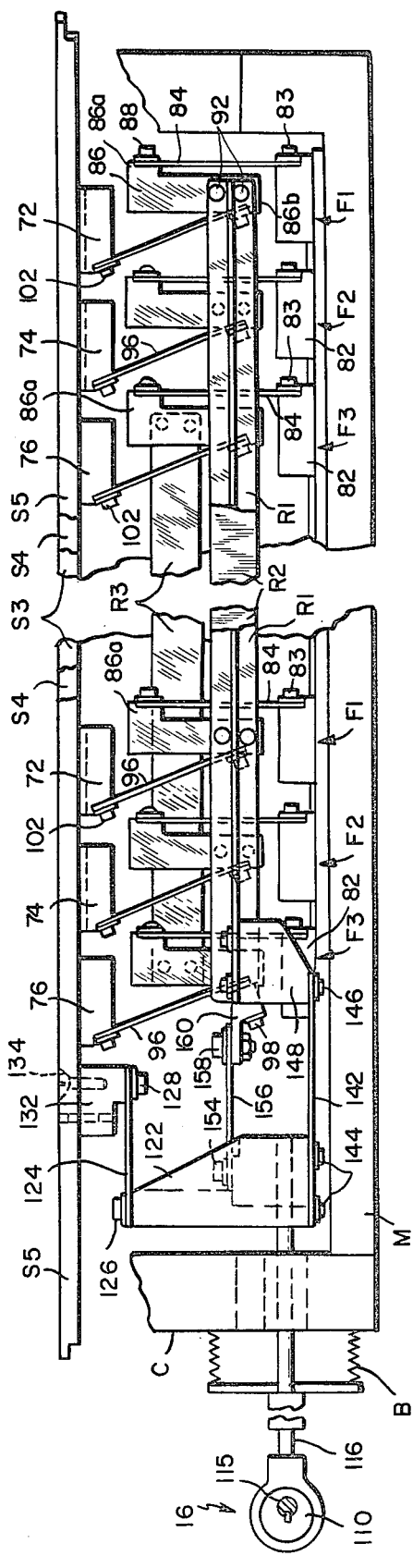
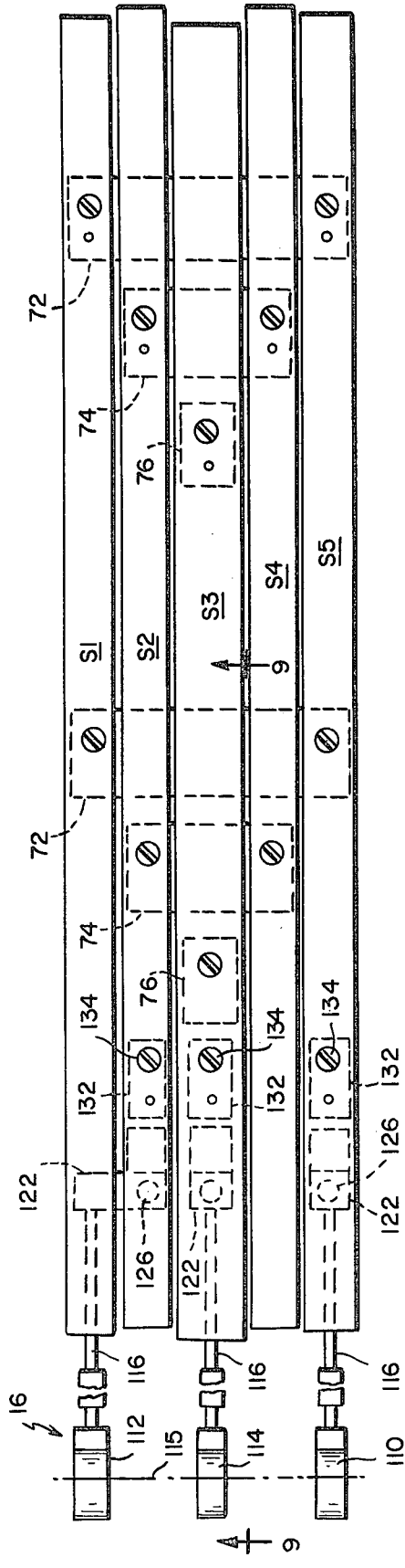
FIG.7
FIG.8

TRANSPORT APPARATUS

This invention relates to transport apparatus. It relates more particularly to apparatus for conveying objects from one point to another along a plane.

BACKGROUND OF THE INVENTION

The present invention may be characterized broadly as a moving floor type of conveyor. That is, due to the motion of the floor, objects placed on the floor at one end will be transported in a more or less straight line to the opposite end of the floor. The specific dimensions of the conveying surface portion of the apparatus depend upon the particular application. In one application, that surface may be relatively long and narrow so that it constitutes a track for transporting small objects through a processing zone or a work station. In another application such as a truck bed, that surface may be relatively wide to enable large objects such as crates to be offloaded from the truck.

The invention has particular application in connection with the transporting of relatively small, fragile articles such as semiconductor wafers through a high temperature processing zone. Accordingly, the invention will be described in that context. It should be viewed, however, in a much broader context as a conveyor for objects more or less of any size and shape.

There are basically three different types of moving floor transports. Perhaps the most common type is the vibratory feeder which comprises an article-supporting surface which is vibrated as part of a resonant spring mass system. While that type transport works satisfactorily, it has several disadvantages, particularly when used to move fragile objects such as semiconductor wafers in a laboratory environment. First, such apparatus tends to be relatively expensive because efforts must be made to isolate the vibrations produced by the apparatus. Despite those efforts, however, some vibratory motion is still coupled through the base of the apparatus into the building structure and to other apparatus and instruments in the vicinity, tending to upset the outputs and readings of those apparatus and instruments.

Also vibrating transports tend to be quite noisy so that they have a dibilitating effect on workers in the vicinity of the apparatus. Still further, vibrating transports being resonant systems can only transport objects at one speed and furthermore, they are not reversible so that the objects can only proceed in one direction on a given transport. Also such apparatus tends to be very large and massive because it requires a large support frame and a counterweight due to its mode of operation. Thus, for example, a four foot long vibratory transport weighing 100 lbs. requires a counterweight of at least 100 lbs. to provide the reaction force for the transport.

Vibrating type transports have particularly serious disadvantages when moving lightweight, fragile objects such as semiconductor wafers. This is because they advance the objects by bouncing those objects along the surface of the transport. Particularly in a high vacuum environment, the objects actually leave the surface and become airborne and then drop back onto the surface at a slightly advanced location thereon. Thus the objects are constantly striking the vibrating surface. Flat, lightweight objects such as semiconductor wafers tend to tilt as they become airborne so that the wafers often strike that surface slightly on edge causing edge chips and scratches which increase considerably the rejection rate for such wafers during processing.

On the other hand, if there is any liquid such as water and oil on the vibrating surface, flat lightweight articles such as semiconductor wafers tend to become adhered to the surface and may not bounce at all. Consequently, those wafers will not be advanced. In addition, the degree of advancement of objects on a vibrating transport depends upon the nature of the object. Thus a succession of semiconductor wafers of slightly different size are advanced by the transport at different rates so that one wafer may overrun another or lag excessively behind another. Finally such vibratory feeders advance whatever solid material is on the surface including dirt and dust particles and other debris which therefore enter the work station or processing zone along with the semiconductor wafers and may contaminate the process.

The second type of moving floor conveyor is the reciprocating slider transport described, for example, in U.S. Pat. No. 2,973,856. In that type conveyor, the surface is composed of an array of sliders or slats arranged side by side with the slats being reciprocated lengthwise in groups so that at any given time more slats are being advancing than are being retracted. Consequently, articles in frictional contact with the slats are moved in the direction of the advancing slats, which are in the majority. That type of transport also has several disadvantages which militates against its use as a conveyor for the small, lightweight, fragile articles of primary interest here. Most importantly, as some of the slats are advancing the objects, other slats are being retracted. These retracting slats inevitably scratch the undersides of the objects and if those objects are semiconductor wafers, ruining them. Also the reciprocating slats or sliders must be mounted in slides of some type and they are reciprocated by various kinds of lever and crank arrangements. To avoid undue parts wear, these slides and cranks must be kept lubricated. However, no know lubrication is able to withstand the high temperatures present in the processing zones used to fabricate semiconductors. Moreover, even if such lubrication could be developed, it would be volatile to some extent at those temperatures so that the emitted gases would contaminate the process being carried out in the working zone.

Also transports of the reciprocating slider type tend to be expensive because they require a large number of cranks, links, levers and other different parts which are relatively difficult and expensive to manufacture and maintain.

The third type of moving floor conveyor is the so-called walking beam conveyor described for example in U.S. Pat. No. 2,644,594. Its transporting surface is composed of an array of slats arranged side by side and divided into groups. In this case, however, one group of slats is raised up out of a reference plane so that it engages under objects on the conveyor, is advanced a short distance and then lowered below the reference plane. The objects supported by that group are thus deposited onto the remaining slats at a slightly advanced location along the conveyor surface. The second and third slat groups are moved in the same way in succession. Thus objects on the surface are lifted up, advanced and lowered repetitively in being conveyed from one end of the surface to the other.

A walking beam type conveyor has the same disadvantages discussed above in connection with the reciprocating slide conveyor. That is it is composed of a large number of different slides, links, levers, cranks and other such parts, all of which require lubrication, making such a conveyor totally unsuitable for use in semiconductor processing environments. So too, the walking beam conveyor is quite complex and expensive to make and maintain.

SUMMARY OF THE INVENTION

Accordingly, the present invention aims to provide transport apparatus which produces minimum amounts of vibration and noise.

Another object of the invention is to provide apparatus of this type which can operate effectively in different hostile environments.

Another object of the invention is to provide transport apparatus which can transport objects along a plane in either direction.

A further object of the invention is to provide such apparatus which is relatively small, compact and lightweight.

Another object is to provide transport apparatus which is relatively inexpensive to make and maintain.

Still another object of the invention is to provide transport apparatus which can move fragile lightweight articles such as semiconductor wafers without damaging them.

Another object is to provide such a transport which advances different objects at the same rate.

Yet another object is to provide such apparatus which can advance a succession of objects while maintaining the spacings between them constant.

A further object of the invention is to provide such apparatus which is composed of a minimum number of moving parts.

Another object of the invention is to provide transport apparatus which can be used in both very dirty and very clean environments.

A further object of the invention is to provide transport apparatus which will move articles such as semiconductor wafers without contaminating the articles or the environment surrounding the transport.

Another object is to provide apparatus for transporting objects which may discriminate between different size objects.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the transport apparatus comprises an array of slats closely spaced side by side. The slats are arranged in groups with each group being supported at its opposite ends from a corresponding group of rails by a pair of flexures, there being at least one rail in each group. Each group of rails is, in turn, supported at its opposite ends by a pair of flexures projecting up from a common base. Thus, each group of slats is flexurally supported by at least one rail which is, in turn, flexurally supported above the base.

Each group of rails in reciprocated by eccentrically driven push rods or other comparable means so that the rail group moves in an arcuate path about its connections to the base. Simultaneously, the slat group corresponding to that rail group is also reciprocated so that, assuming the rail group was stationary, that group of slats would move in an arcuate path about its connections to that rail group. However, as just stated, that group of rails is also moving arcuately. Furthermore, in accordance with this invention, those corresponding groups of slats and rails are reciprocated out of phase. Therefore, the resultant movement of that slat group relative to the base is a combination of the two motions, namely an orbital motion.

Actually each point on the slats of that group follows a generally elliptical path in space. Moreover, the ellipse has a relatively large eccentricity and its major axis lies more or less parallel to the base so that the elliptical path is relatively long and flat. Resultantly, that group of slats orbits through a reference plane defined by the centers of the elliptical paths for all points lying on those slats with the excursions of the slats in the direction parallel to the base being relatively long relative to the excursion in the direction perpendicular to the base.

The other corresponding groups of slats and rails are moved in the same way so that the slats in each group orbit through that same reference plane.

Further, in accordance with this invention, the different corresponding groups of slats and rails are also operated out of phase with one another so that at any given instant the different groups of slats are positioned at different locations in their orbits. In other words the different slat groups execute the same orbital motion relative to the base, but follow one another. Thus for example in transport apparatus with three corresponding groups of slats and rails, the different groups are reciprocated 120° out of phase with one another so that the three different groups of slats are approximately 120° apart in their orbital paths relative to the base.

If now a relatively rigid object such as a silicon wafer whose width is commensurate with the width of the slat array is deposited onto the apparatus at one end of the slat array, it is advanced toward the opposite end of the array by the different groups of slats in succession as they execute their out-of-phase orbital motions relative to the base.

Because of the shape of the orbital paths followed by the slats as described above, the object is lifted gradually to an elevated position spaced just slightly above the reference plane, advanced a relatively long distance substantially horizontally relative to the base and then gradually lowered toward the reference plane. Whereupon, at that advanced location, the object is immediately engaged by a second group of slats and advanced in a similar fashion to be gradually lowered toward the reference plane at a point still further along in the apparatus where it is engaged by the next group of slats, and so on. Thus the object is advanced quite rapidly. Of course, the object to be advanced cannot be too limp, because in that event, parts of the object would sag down onto the nonoperative slats moving in the opposite direction.

Further the object is raised sufficiently above the reference plane during its advancement by each group of slats such that its underside is assuredly spaced above the slats in the other groups whose motions are not in the advancing direction. Consequently, there is little likelihood of the underside of a fragile object such as a semiconductor wafer being scratched or scraped due to relative motion between the wafer and those other slats. Still, however, it is important to note that the object is never raised appreciably above the reference plane and the motions to and from that plane are quite gradual so there is no tendency for the object to be thrown from the slats that are supporting it at any given instant. Rather the movement of the object along the transport apparatus is quite gentle. Therefore there is little or no likelihood of even very fragile articles such as semiconductor wafers becoming airborne and being damaged as they are being conveyed along by the transport apparatus even in a high vacuum environment.

As alluded to above, the groups of slats and rails can be reciprocated as described by means of push rods driven by a single variable-speed, reversible motor. Therefore, the apparatus can advance objects at practically any selected speed in either direction simply by varying the speed of, or reversing, the motor. Moreover, if a succession of objects is placed on the transport apparatus, all the objects are advanced at the same rate regardless of their names so that the spacings between the objects in the succession remain uniform. This is especially important in processing applications where the advancement of objects to or from a work station must be precisely timed for one reason or another.

It is an especially important feature of the present apparatus that no slides, cranks, levers or other such parts requiring lubrication are used to support the transporting slats or to enable them to execute their orbital motions. Rather the orbital motion is achieved by virtue of the flexures which require no lubrication whatsoever. This means that the groups of slats, rails and flexures can all be exposed to the elevated temperatures or other hostile conditions to which the semiconductor wafers are subjected in the processing zone without degrading the performance of the transport apparatus and without contaminating the environment in that zone.

For example, if the process is carried out in a sealed chamber, the slats, rails and flexures can all be positioned right in the chamber with the rails and slats being reciprocated by push rods extending out of the chamber by way of flexible metal bellows seals. By reciprocating the push rods at a selected speed using a standard variable speed motor, the orbiting slats will transport a wafer from one end of the chamber to the other at a speed dependent upon the motor speed. Once the components of the transport apparatus inside the chamber are outgassed there is no further source of outgassing because they then never require lubrication. From that point on, then, those parts do not affect the process environment within the chamber.

Usually process chambers of this type are provided with air locks at the opposite ends of the chamber to isolate the interior of the chamber from the atmosphere. Objects are transported into the chamber through one lock and exit the chamber through the other lock so that, as objects enter and leave the chamber, the atmospheric integrity of the chamber remains intact. Thus using the present transport apparatus in that application requires five slat-rail-flexure sets, there being, say three different corresponding groups of slats and rails in each set. The first transport moves objects to the air lock at the entrance end of the chamber, the second transport conveys objects through the entrance air lock, the third transport conveys the objects through the process chamber, the fourth transport moves the objects through the air lock at the exit end of the chamber, and the fifth transport conveys the objects from the exit air lock to some destination.

However, the corresponding groups in each transport set can be reciprocated in unison by connecting them via bellows isolated push rods to the same driving eccentrics located exteriorly of the air locks and chamber. In this event, of course, sufficient space is provided between the ends of adjacent sets of slats at the ends of the air locks to accommodate the doors or gate valves for the locks. Since the corresponding slats in each set move together, that space need not be so large that the objects cannot bridge the gap as they are transported from one set of slats to the next. However, that gap between adjacent sets of slats does prevent dirt or moisture present on one set of slats from being conveyed to the next set of slats and into the chamber. When it is necessary to close the gate valves in order to purge the locks, the three groups of slats can be aligned endwise so as to provide a slot between adjacent sets of slats which extends across the entire width of the transport.

Using such an arrangement then, objects can be transported through an isolated process zone at a selected speed so that they remain in the zone for the required length of time. Indeed, objects can be transported to the zone at one speed and then transported through the zone at a second speed. If additional process time is required, the transport sets can be stopped so that the objects can remain the process zone indefinitely. Since the apparatus advances all objects at the same rate regardless of size, the spacings between objects deposited on the apparatus remain constant. Consequently the location of each object is precisely determined once it is placed on the transport, thereby enabling the control of that apparatus and ancillary locks to be carried out automatically and by remote control, using conventional object position sensors.

As the present transport operates quite well in a clean atmosphere, it also performs well in a dirty environment since there are no relatively moving parts whose movements are impeded by such dirt. The flexures, which simply bend, are not at all affected by such debris.

Thus the present transport apparatus is quite small and compact and is composed of a relatively few, repetitive, comparatively inexpensive parts. Consequently the overall cost of the apparatus is less than prior comparable transports of this general type. Accordingly it should find wide application wherever objects have to be conveyed from one point to another either in a controlled atmosphere or in air.

BRIEF DESCRIPTION OF THE DRAWINGS

For a fuller understanding of the nature and objects of the invention, reference should be had to the following detailed description, taken in connection with the accompanying drawings, in which:

FIG. 1 is a top plan view partly in block form illustrating a semiconductor wafer process line employing orbital transport apparatus made in accordance with this invention;

FIGS. 5A to 5D illustrate various motion paths produced by the FIG. 2 apparatus under different conditions;

FIG. 6 is a fragmentary perspective view of a portion of the FIG. 2 apparatus used for object path switching purposes;

FIG. 7 is a side elevational view with ports cut away showing a modified transport embodiment;

FIG. 8 is a top plan view of the FIG. 7 apparatus embodiment;

DESCRIPTION OF THE PREFERRED EMBODIMENTS

Figure 2:
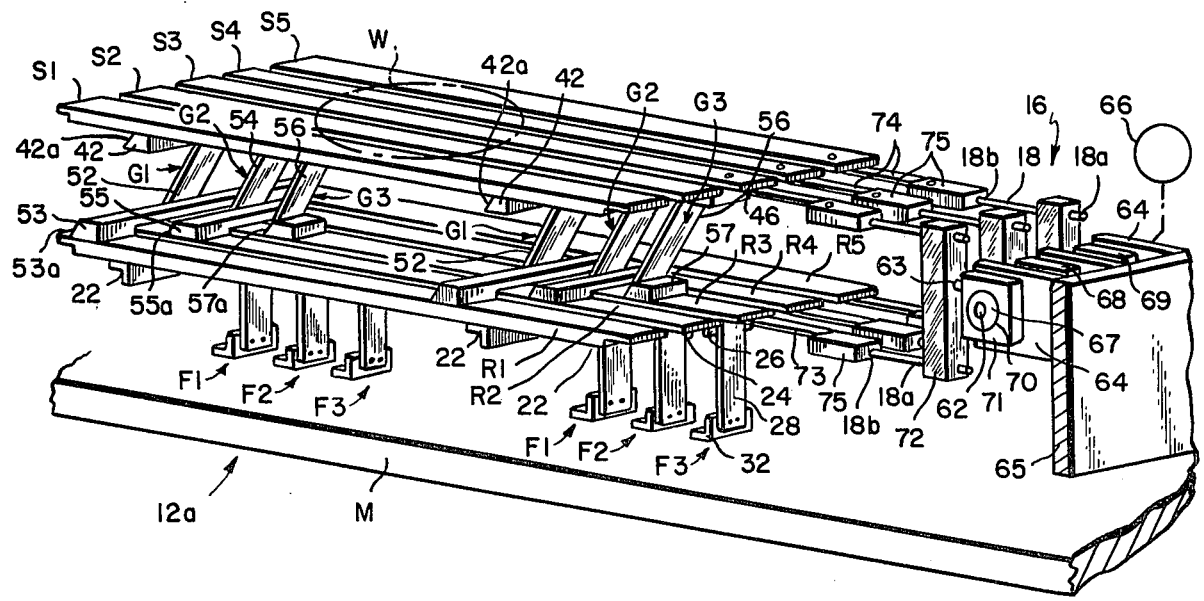
FIG. 2 is a perspective view showing in greater detail a transport apparatus used in the FIG. 1 process line.

Turning to FIG. 1 of the drawings, we will describe the present transport apparatus as it might be used in a process line to transport semiconductor wafers W into, through and out of a process chamber C. In this application, the chamber C usually contains a controlled environment. Accordingly an air lock $L_1$ is provided at the entrance end to the chamber and a second air lock $L_2$ is provided at the exit end thereof. Usually as is customary in such an application, a succession of wafers W are transported to the entrance air lock $L_1$ while its door or gate $G_1$ is open. After the wafers have entered the air lock, the gate $G_1$ is closed and the lock $L_1$ is purged. Following this, the exit gate $G_2$ of the entrance air lock is opened and the wafers are transported into the process chamber C following which the gate $G_2$ is closed.

The wafers remain in chamber C for a selected period of time depending upon the particular process. The dwell time of the wafers in the chamber may be controlled by stopping the wafer transport apparatus in the chamber for a selected period of time or by selecting the transport speed and chamber length so that if the wafers are transported along the chamber at a selected rate, by the time they reach the exit end of the chamber, the process will have been completed. In any event, when the wafers in the chamber have been processed, they are transported into the exit air lock $L_2$ while its entrance gate $G_3$ is open. After that gate is closed, the chamber $L_2$ is purged and its exit gate $G_4$ opened to permit the wafers to be transported out of lock $L_2$ and to the next work station.

Thus the FIG. 1 process line contains five separate transports. The transport 12a conveys the wafers to the entrance air lock $L_1$, the transport 12b moves the wafers through that air lock, the transport 12c transports the wafers through the process chamber C, the transport 12d conveys the wafers through the exit air lock $L_2$ and finally a fifth transport 12e moves the wafers to the next work station. Because of drawing size limitations, only a single wafer W is shown on each transport. In actual practice, however, each such apparatus would support a succession of wafers which would be advanced into and out of the process chamber C on a more or less continuous basis.

In illustrated process line 10, all of the transports 12a to 12e are driven in unison by a single drive section 16. The drive section 16 is connected to the first transport apparatus 12a in the line 10 by a set of push rods 18. Similar sets of push rods 18 interconnect the adjacent transports 12a to 12e. Also to maintain the air tight integrity of the chamber C and locks $L_1$ and $L_2$, flexible metal bellows seals B are provided in the lock and chamber walls at the points where the rods 18 penetrate the walls to provide a flexible fluid-tight seal between the rods and the lock and chamber walls. As we shall see, the illustrated line 10 requires twenty-four such bellows arranged in two layers.

Figure 3:
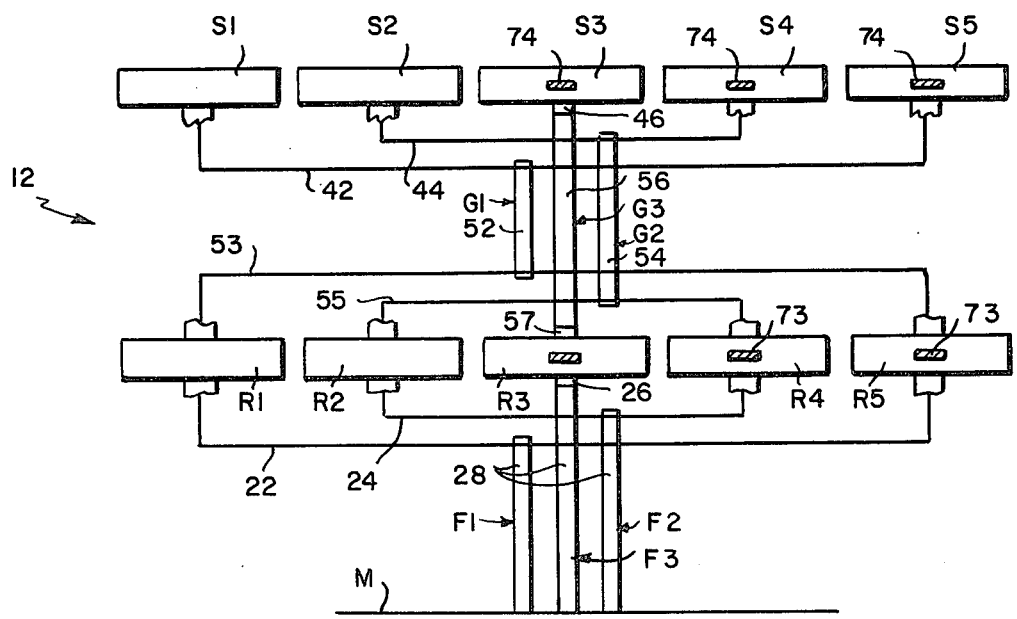
FIG. 3 is a diagrammatic view showing in greater detail various interconnections between the components of the FIG. 2 apparatus.

Referring now to FIGS. 2 and 3, since the transport apparatus 12a to 12e are more or less the same except perhaps for their lengths, we will only describe transport 12a in detail. It comprises an array of spaced-apart parallel rails. The illustrated apparatus has five such rails designated $R_1$ to $R_5$. The specific number of rails in the array depends to some extent on the width of the article being conveyed and the transportation characteristics desired for that article as will be discussed later. In any event, the rails are divided into a plurality of different groups, with the rails in a given group being connected together. Thus in the apparatus 12a, the rails $R_1$ and $R_5$ are connected together at their opposite ends by cross beams 22 secured to their undersides, the beams spanning the intervening rails $R_2$ to $R_4$. Shorter beams 24 interconnect the opposite ends of rails $R_2$ and $R_4$, spanning the center rail $R_3$. A pair of blocks 26 are affixed to the underside of rail $R_3$ near its opposite ends for reasons that will become apparent presently.

Each group of rails is supported above a base M by two or more flexure assemblies extending up from base M and secured to one or another of the beams 22, 24 and blocks 26. Thus in the illustrated apparatus, a pair of flexure assemblies $F_1$ support the opposite ends of the first rail set $R_1$, $R_5$. A second pair of flexure assemblies $F_2$ support the opposite ends of rail set $R_2$, $R_4$ and a third set of flexure assemblies $F_3$ support the opposite ends of the innermost rail $R_3$. Depending upon the lengths of the rails, additional flexures may be added to each set to provide adequate support for the rails along their entire lengths.

All of the flexure assemblies $F_1$ to $F_3$ are arranged more or less in a straight line and they are all more or less identical. Each comprises an upstanding, flexible, resilient strap-like flexure 28. The lower end of the flexure is secured to a generally L-shaped bracket 32 mounted to base M. The upper ends of the flexures in each set are fixed to move with the corresponding group of rails. In particular, the upper ends of the flexures 28 in flexure assemblies $F_1$ are affixed to beams 22 connecting the group of rails $R_1$, $R_5$. Likewise, the upper ends of the flexures 28 in assemblies $F_2$ are secured to beams 24 linking the second group of rails $R_2$, $R_4$ and finally the upper ends of the flexures 28 in assemblies $F_3$ are connected to blocks 26 at the undersides of the innermost rail group $R_3$. The lengths of all of the flexures 28 are substantially the same so that all of the rails $R_1$ to $R_5$ are flexurally supported in more or less the same plane above base M as illustrated in FIGS. 2 and 3.

Still referring to those same figures, an array of spaced-apart, parallel slats $S_1$ to $S_5$ are arranged above rails 1 to 5. As a general rule, there are at least as many slats in the transport apparatus as there are rails, i.e. five in this example. Also the slats are arranged in groups similar to the groups of rails. Thus slats $S_1$ and $S_5$ comprising one group are connected together at their opposite ends by crossbeams 42 attached to their undersides and bridging the remaining slats $S_2$ to $S_4$. A second pair of beams 46 connect the second group of slats $S_2$, $S_4$ bridging the intervening slats $S_3$. Finally a pair of blocks 46 are connected to the underside of the middle slat $S_3$ near its opposite ends.

The slats $S_1$ to $S_5$ are supported above rails $R_1$ to $R_5$ by three sets of flexure assemblies $G_1$ to $G_3$, there being at least two assemblies in each set, one near each end of the apparatus. Assembly $G_1$ comprises a strap-like flexure 52 whose upper end is connected to the beveled edge 42a of beam 42. The lower end of flexure 52 is connected to the beveled edge 53a of a beam 53 connected to the tops of rails $R_1$ and $R_5$ near the opposite ends thereof. Each flexure assembly $\hat{G}_2$ consists of a strap-like flexure 54 whose upper end is connected to the beveled edge 44a of beam 44 linking slats $S_2$ and $S_4$, while the lower end of strap 54 is secured to the beveled edge 55a of a beam 55 connecting rails $R_2$ and $R_4$. Finally each flexure assembly $G_3$ comprises a strap 56 whose upper end is connected to the beveled edge 46a of block 46 at the underside of slat $S_3$ and whose lower end is connected to the beveled edge 57a of a block 57 secured to the top of rail $R_3$. The flexure assemblies $G_1$ to $G_3$ are arranged in a straight line directly above the flexure assemblies $F_1$ to $F_3$ so that they support the slats $S_1$ to $S_5$ in a substantially horizontal plane spaced above and parallel to the plane defined by the array of rails $R_1$ to $R_5$. Thus, each set of slats is flexurally supported above the underlying corresponding set of rails which, in turn, is flexurally supported above the base M.

Still referring to FIG. 2, the groups of slats and rails are reciprocated selectively by the drive section 16. Section 16 comprises a shaft 62 journalled in a pair of standards 64 projecting out from an upstanding support 65 mounted on base M. The shaft is rotated by a variable speed motor 66 also mounted to the base. Spaced apart along shaft 62 are three eccentrics 67, 68 and 69. Engaged around each eccentric is a circular bearing unit 70 and press fit onto the outer race of each bearing unit is a rectangular block 71. A long vertical block 72 is connected by a stub 63 to each block 71. Three pairs of push rods 18 (only three of which are shown in FIG. 1) are connected at their ends 18a to opposite ends of the three blocks 72. The opposite ends 18b of the pair of rods connected to each block 72 are connected to corresponding rail and slot groups by way of lower and upper flexible straps or flexures 73 and 74. Those straps permit the rods 18 to tilt as the eccentrics rotate. Preferably, a turnbuckle 75 is positioned between each rod end 18b and the associated flexure 73 or 74 so that the distance between each rail or slat and block 72 can be adjusted. Those lengths determine the phase angle difference between the corresponding rail and slat groups.

Thus in the illustrated apparatus, there are three straps 73 connected to the right-hand ends of rails $R_3$, $R_4$ and $R_5$, all of which rails are in different rail groups. Likewise, there are three straps 75 connected to the right-hand ends of slats $S_3$, $S_4$ and $S_5$ which are also in different slat groups. When the three eccentrics 67 to 69 are rotated to reciprocate the three groups of rails and the three groups of slats, the rails in each group execute more or less the same motion and the slats in each group execute more or less the same motion. However, each group of slats executes a different motion from the corresponding group of rails.

Figure 4:
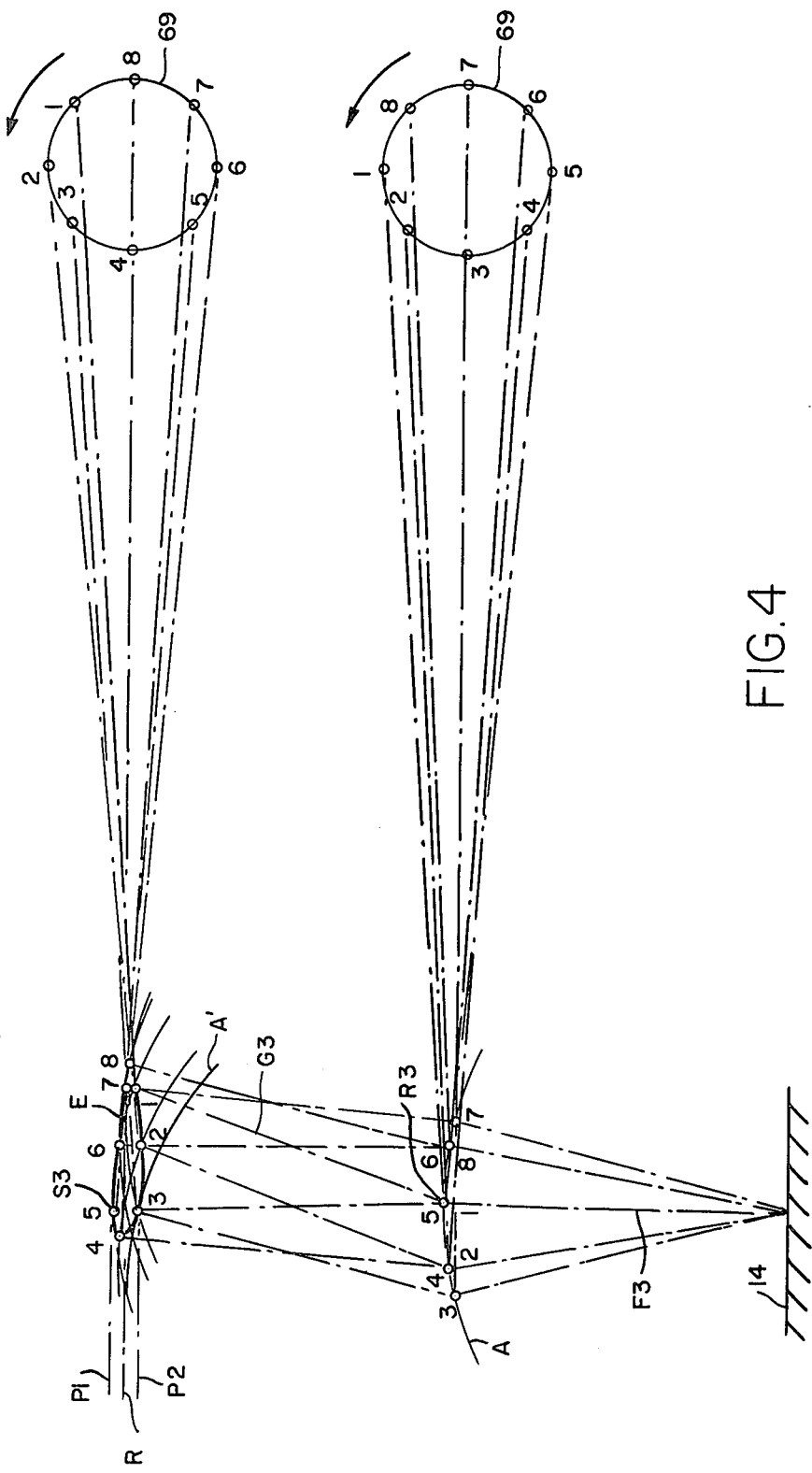
FIG. 4 is a schematic diagram illustrating one example of the motion paths of various components in the FIG. 2 apparatus.

FIG. 4 illustrates diagrammatically the locus of movement of a given point on a given group of rails, say rail $R_3$, and the superimposed motion of a given point on the corresponding group of slats, i.e. slat $S_3$. We have designated the given rail and slat points $R_3$ and $S_3$ respectively. Furthermore the motions of the rail and slat points are shown coordinated with the angular positions of their corresponding driving eccentric 69. As seen from that figure, when eccentric 69 is rotated counterclockwise, the supporting flexures $F_3$ cause rail point $R_3$ to follow an arcuate path A. The position of that point on the rail at any instant is correlated with the angular position of the eccentric by the numbers 1 to 8 inscribed on the eccentric and on the arc A.

Assume for a moment that the rail point $R_3$ is stationary in its uppermost position at location 1 in FIG. 4. If now eccentric 69 should be rotated counterclockwise, the flexures $G_3$ cause the overlying point on slat $S_3$ to move about rail point $R_3$ in an arcuate path A' similar to path A and directly above path A, assuming, of course, that the flexures $F_3$ and $G_3$ are of equal length. However, as we have seen, the rail point $R_3$ is not stationary. Rather the point $R_3$ about which the slat point $S_3$ swings is itself swinging relative to base M along path A. Resultantly, the actual movement of the point $S_3$ relative to base M is along a path E which is shaped like a highly eccentric ellipse. The numbers 1 to 8 inscribed on the path E denote instantaneous positions at point $S_3$ and these are correlated with the positions of point $R_3$ at those same times. Likewise the numbers 1 to 8 inscribed on eccentric 69 indicate the instantaneous positions of the eccentric at those same times.

It will be appreciated that the corresponding groups of slats and rails do not have to be operated in phase. Indeed, in the example illustrated in FIG. 4, due to the different lengths of the push rods 18 linking eccentric 69 and the rails $R_3$ and slats $S_3$, the slats $S_3$ lag behind rails $R_3$ by one numbered position. By changing the phase difference between the movements of these members, a variety of differently shaped elliptical paths E can be generated.

FIGS. 5A to 5D illustrate four different elliptical paths E which are produced by various phase angle differences between the slats and rails in FIG. 4.

Also, of course, the movements of each rail group and the corresponding slat group is governed to some extent by the lengths of the flexures in the flexure assemblies $F_3$ and $G_3$. Likewise different motions are produced depending upon the amount of eccentricity in the driving eccentric. Consequently, an even greater variety of orbital path shapes E can be obtained by varying those flexure lengths and the eccentricity. In this particular application, the flexure assemblies $F_3$ and $G_3$ are of substantially equal length and the locus of movement of the slats along path E shown in FIGS. 4 and 5D has been found to work quite satisfactorily and this is produced by a phase difference between the corresponding slat and rail movements of about 20°. In this example, an eccentricity of about $\frac{1}{8}$ inch provides a $\frac{1}{4}$ inch stroke of each slat group and a 0.020 inch lift of each slat group. In this connection we should mention that the movement paths in FIGS. 4 and 5 are drawn oversize for clarity.

Still referring to FIG. 4, due to the above described complementary motions of the corresponding groups of rails and slats, each slat group is orbited along a relatively long flat elliptical path E so that the slat group is raised gradually above a reference plane R to an elevated plane $P_1$. Thereupon, the slat group is gradually lowered through the reference plane R to a lower plane $P_2$ whereupon the slat group is then raised gradually back to the reference plane to complete one orbit. Thus if an object is positioned on the reference plane, the slat group $S_3$ engages the underside of the object and raises the object gently and gradually to the elevated plane $P_1$ slightly above the reference plane. As it is moving through this very short vertical distance, the object is transported laterally relative to plane R and base M a considerable distance due to the large eccentricity of the elliptical path E and thereupon the object is then gently lowered back toward the reference plane R.

Assuming that the object cannot pass below the reference plane, the slat group $S_3$ will disengage from the object as the group follows its orbit toward the lower plane $P_2$. The slat group will continue along its orbit until it reengages the underside of the object at a location in the reference plane R spaced from the original location of the object by a distance equal substantially to the major axis of the elliptical path E. During the next orbit of the slat group $S_3$, the object is again picked up, raised slightly above the reference plane and again advanced along the reference plane and relative to base M a distance equal to the major axis of the elliptical path E, and so on. Thus the object is gradually transported horizontally relative to the reference plane and to the base M.

Referring now to FIGS. 2 and 4, as the corresponding groups of rails and slats, e.g. rail $R_3$ and slat $S_3$, are reciprocated out of phase, so too are the different groups of rails and slats. More particularly, the different groups of rails and slats are displaced equally in phase from one another. Thus there being three different groups of rails and slats, each group is displaced 120° in phase relative to the others. Consequently, at any given instant, the three groups of slats are positioned at different locations along the orbital path E illustrated in FIG. 4. For example, when the slat group $S_3$ is located at location 5 in FIG. 4 above the reference plane R, the slat group $S_1$ is located between points 7 and 8 just above the reference plane, while slat group $S_2$ is positioned between points 2 and 8, below the reference plane. An instant later, the slat group $S_3$ might be located at point 3 below the reference plane while slat group $S_1$ is located between points 5 and 6 above the reference plane R and slat group $S_2$ is located between points 1 and 8 just below the reference plane.

Thus as the three different groups of slats orbit out of phase relative to one another, a wafer W or other relatively rigid object positioned on the slat array is gently engaged by a given slat group, raised gently to the elevated plane $P_1$ in FIG. 4 and advanced a relative long distance relative to base M before being lowered toward the reference plane. Whereupon the next slat group engages the underside of the wafer at that advanced location and raises the wafer gently to the elevated plane $P_1$ while advancing the wafer the next incremental length along the slat array and relative to the base before lowering it gradually toward the reference plane where it can be picked up by the next slat group in the array, and so on. Thus a wafer W deposited on the entrance end of the transport apparatus 12a in FIGS. 1 and 2 is conveyed incrementally along that apparatus with each incremental advancement of the wafer relative to base M occurring along a path similar to the upper half of path E in FIG. 4. When the wafer W reaches the end of the transport apparatus 12a, it bridges the gap between that apparatus and the next transport 12b (FIG. 1) whose corresponding slats are moving in unison with those of the apparatus 12a, whereupon the wafer is transported into the lock $L_1$, assuming that its gate $G_1$ is open at the time.

Because of the long relatively flat, generally elliptical path E followed by each slat group as it orbits, the wafer W is lifted quite gradually and gently only a relatively short distance on the order of 0.020 inch while it is being advanced a relatively long distance, e.g. $\frac{1}{4}$ inch, relative to base M before being deposited on the next slat group at that advanced location. Because of this gentle movement, the wafer W never leaves the overall slat array. Furthermore, the wafer is never moved relative to the particular group of slats in the array that is contacting the wafer at any given instant. Consequently, there is very little likelihood of the wafer becoming damaged or scratched as it is being conveyed along the apparatus. If even more gentle movement of the objects is desired, additional corresponding groups of slats and rails operating out of phase may be added to reduce the length of each incremental advance of the object.

It is important to note also that the transport apparatus 12a in FIG. 2 as well as the other apparatus illustrated in FIG. 1 can be reversed simply by reversing the motor 66 driving the eccentrics. This reverses the orbital path E followed by each slat group illustrated in FIG. 4 or FIGS. 5A to 5D causing the wafer W to be transported in the opposite direction along the apparatus. Also the speed at which the wafer W is conveyed along the transport apparatus can be varied simply by varying the speed of motor 66. In that event each slat group follows the orbital path E illustrated in FIG. 4, but at a different orbital speed.

It is important to note that the wafer W is conveyed along the transport because it spans the different groups of slats in the array. On the other hand, dirt, moisture and other debris which reposes on a single slat is not transported along the apparatus relative to base M. The dirt simply orbits along with that particular slat following a single orbital path E. Thus in the FIG. 1 process line 10, such debris is not conveyed from the apparatus 12a across the intervening gap to transport apparatus 12b in lock $L_1$. Consequently, the slat group $S_1$, $S_5$ inside chamber C, once cleaned, remains so even after prolonged usage.

Also since the groups of slats and rails are supported by simple flexures rather than by rotating or sliding parts, no lubrication is required for them. Consequently, once the slats, rails and flexure assemblies, which are the only components of the transport apparatus required to be exposed to the controlled environment of chamber C, are outgassed prior to introducing wafers into the chamber, those parts remain clean and do not contaminate the controlled atmosphere inside the chamber. Of course, the rotary components in drive section 16 which do require lubrication are isolated from the chamber C and the locks $L_1$ and $L_2$ by the bellows seals B. Likewise, if the atmosphere inside chamber C is contaminated or dirty because of a grinding or sawing step carried out therein, the resulting dirt and debris has virtually no effect on the movement of the slats and rails since such debris does not interfere at all with the bending of the flexures supporting those members. Nor is such contamination carried by the transport out of the sealed chamber C.

It is important to note also that unlike the case with vibratory type transports, all objects on the slat array move at the same rate along the array relative to base M even though those objects may have different weights or masses. Consequently, wafers W deposited onto one end of transport 12a in succession maintain the same spacing as they are being transported along that apparatus. Thus there is no problem of the wafers overrunning one another as they are being conveyed along the process line 10. For this reason also, the speed of the line and the dwell time of the wafers W in chamber 10, as well as the opening and closing of the various lock gates $G_1$ to $G_4$ can be controlled automatically even from a remote location.

A particular transport apparatus or a succession of such apparatus can also be arranged to discriminate as to the sizes of the objects which they convey. More particularly, the objects will not be transported unless they span at least two different groups of slats in the array. Consequently, if the slats in the slat groups become progressively wider, objects will be transported along the apparatus until they fail to span at least a plurality of slat groups. At that point, a given object will stop being transported horizontally relative to base M and simply orbit in place. Provision may be made at that location for removing that particular object from the transport apparatus to permit the larger objects behind it to continue on to the points where they also fail to span at least a plurality of slat groups.

The objects may be removed from the transport by a similar offloading transport apparatus superimposed on, and oriented at an angle relative to, the main one. In this event, the slats in the main transport may be notched to accommodate the slats in the off-loading transport. An arrangement such as this is illustrated in FIG. 6, slats $S_1$, $S_2$ and $S_3$ representing the three different groups of slats in the FIG. 2 apparatus and the slats $T_1$, $T_2$ and $T_3$ representing three different groups of off-loading slats. Slats $S_1$ to $S_3$ are notched at N to accommodate slats $T_1$ to $T_3$. The size of the notches N in the slats $S_1$ to $S_3$ depends upon the excursions of the tracks $T_1$ to $T_3$ as they follow their orbital paths E. Also, of course, the number and width of the off-loading slats $T_1$ to $T_3$ should equal the number and width of slats $S_1$ to $S_3$ at the point thereon where the objects are being off-loaded.

Referring again to FIG. 2, the transport apparatus of this invention is composed of a relatively few different parts. Furthermore most parts are relatively inexpensive. Consequently, the apparatus can be manufactured at a relatively small cost as compared with vibratory and other types of transports, particularly those used for conveying small, very lightweight objects such as semiconductor wafers. Moreover, the present apparatus is quite compact and lightweight since it requires no heavy frame or counterweight as are needed in prior vibratory transports. Also since the only motion involved in the apparatus is the orbital motion of the different track and rail groups, the apparatus produces little or no noise or vibration which might upset people and other equipment in the vicinity of the transport.

The embodiment of the transport apparatus depicted in FIG. 2 is somewhat disadvantaged in that it is relatively high because of the requirement for the two different levels of rails and slats to achieve the desired orbital motion of the slats. It would be desirable to be able to achieve that same effect while reducing the head room required for the transport apparatus. FIGS. 7 to 10 depict a folded version of the transport apparatus which accomplishes the above objectives. Not only is that modified apparatus more compact, it also requires fewer different parts and is therefore less expensive to make.

This embodiment also includes an array of slats $S_1$ to $S_5$ arranged in three different groups and underlying corresponding groups of rails. In this case, however, there is only one rail in each group, the three different rails being designated $R_1$, $R_2$ and $R_3$. As before, the corresponding groups of rails and slats are supported at their opposite ends above base M by three different sets of flexure assemblies $F_1$, $F_2$ and $F_3$. In this case, however, a single set of flexure assemblies supports both the set of slats and the corresponding rail. Thus flexure assemblies $F_1$ support rail $R_1$ and slats $S_1$ and $S_5$ which are connected together at their opposite ends by beams 72. Likewise flexure assemblies $F_2$ support rail $R_2$ and the overlying corresponding set of slats $S_2$ and $S_4$ which are connected together at opposite ends by beams 74. Finally, flexure assemblies $F_3$ support rail $R_3$ as well as the innermost slat $S_3$ which has a pair of blocks 76 secured to its underside near the opposite ends of that slat. The rail $R_1$ is secured to the sides of the flexure assemblies $F_1$ at one side of the apparatus. The rail $R_2$ is connected to the sides of flexure assemblies $F_2$ at the opposite side of the apparatus and the rail $R_3$ is connected to the sides of flexure assemblies $F_3$ at that same side of the apparatus, rail $R_3$ being located directly above rail $R_2$ as best shown in FIG. 7.

Figure 9:
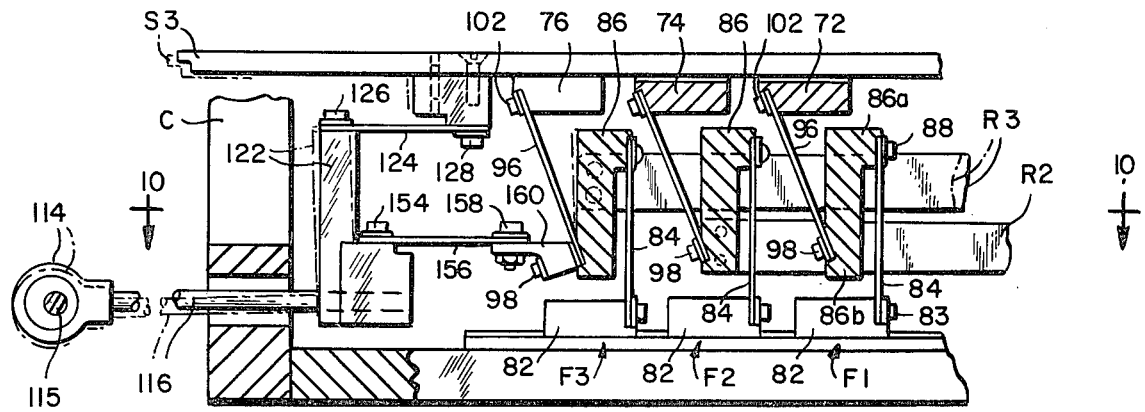
FIG. 9 is a sectional view along line 9—9 of FIG. 8.
Figure 10:
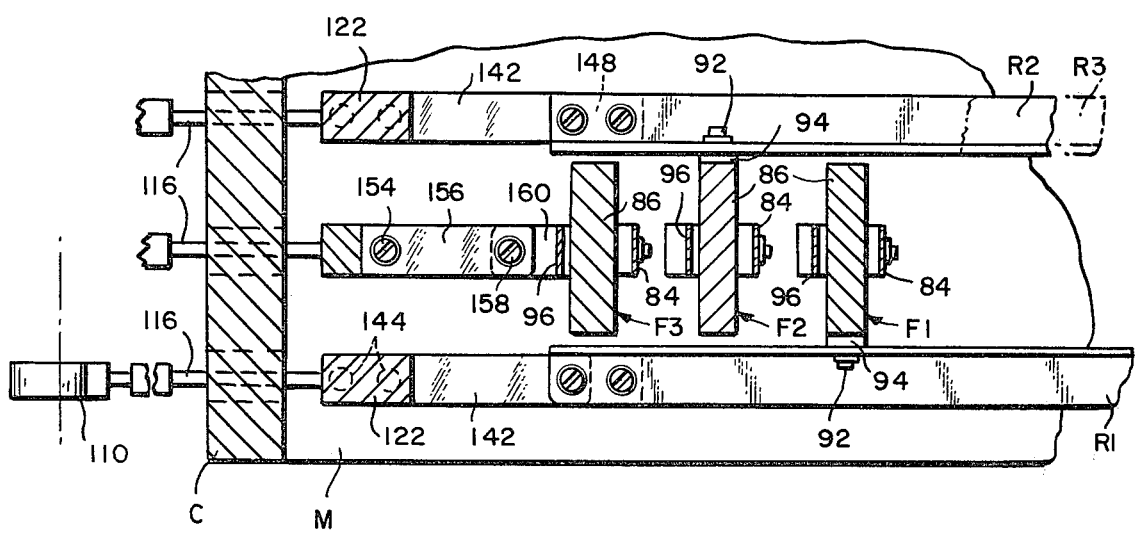
FIG. 10 is a sectional view along line 10—10 of FIG. 9.

The flexure assemblies are all arranged in a straight line and they are more or less identical. Each assembly includes a lower block 82 mounted to base M, the block supporting by screws 83, an upstanding flexible resilient strap or flexure 84. Secured to the upper end of strap 84 is an inverted L-shaped upper block 86, the short leg 86a of the block being connected to the strap by screws 88. The long leg 86b of that block extends down parallel to strap 84 terminating above block 82. The rail associated with that particular flexure assembly is connected by screws 92 to the block leg 86b. Thus, for example, as seen in FIGS. 7 and 10, the rail $R_1$ is connected to the sides of the blocks 86 of flexure assemblies $F_1$ near their lower ends. As best seen in FIG. 10, small spacers 94 are positioned between the rail $R_1$ and the blocks 86 so that the rail clears the blocks in the other two flexure assemblies $F_2$ and $F_3$. In a like manner, the rail $R_2$ is connected to the sides of blocks 86 in flexure assemblies $F_2$, similar spaces 94 being provided between that rail and the blocks. The connections between the rail $R_3$ and flexure assemblies $F_3$ are somewhat different in that the rail is secured to the blocks 86 in those assemblies near the upper ends of their legs 86b as best seen in FIGS. 7 and 9 so that the rail $R_3$ is spaced above rail $R_2$.

Each flexure assembly $F_1$ to $F_3$ also includes a second flexible resilient strap or flexure 96 which extends between the lower end of the block leg 86a of that flexure to the beam or block connected to the group of slats associated with that particular flexure. Thus, for example, as seen in FIG. 9, strap 96 in flexure assembly $F_1$ is connected by appropriate fasteners 98 to the lower end of block leg 86b of that assembly with its upper end being secured by similar fasteners 102 to the left hand edge of beam 72. Also the surfaces of the block 86 and beam 72 to which the strap 96 is connected are inclined or beveled so that the strap is oriented at an angle relative to the perpendicular direction. The transport apparatus works satisfactorily if the included angle between the strap and the perpendicular direction is on the order of 20°.

As is apparent from FIG. 7, each rail $R_1$ to $R_3$ is flexurally supported above base M by the resilient straps 84 in the flexure assemblies associated with that rail. Consequently each rail can be reciprocated and, when that is done, the rail follows an arcuate path similar to path A illustrated in FIG. 4. Likewise each group of slats is flexurally supported above the corresponding rail by the resilient straps 96 in the flexure assemblies associated with that group of slats. Consequently that slat group can be reciprocated relative to the associated rail so that, if the associated rail were stationary, the slat group would move along an arc similar to arc A' shown in FIG. 4. However, if the corresponding rail and slat group are reciprocated simultaneously, the slat group orbits around a generally elliptical path similar to path E depicted in FIG. 4. The particular shape of that path depends primarily upon the phase angle difference between the slat group and its corresponding rail just as is the case with the FIG. 2 apparatus described above. In the present instance, however, the out-of-phase reciprocation of each slat group and its corresponding rail is achieved using only a single eccentrically-driven push rod.

Thus in this embodiment the drive section 16 includes three eccentrics 110, 112 and 114 mounted on a motor driven shaft 115. Connected to each eccentric is a push rod 116 which extends through an opening in the side wall of chamber C, the opening being sealed by a flexible metal bellows seal B connected between the chamber side wall and the push rod. The end of each push rod 116 inside chamber C is connected to an upstanding block 122. As best seen in FIG. 7, the upper end of each such block is connected to one end of a flexible resilient strap 124 by means of one or more threaded fasteners 126, the opposite end of each strap 124 being secured by a fastener 128 to a block 132. The three blocks 132 are in turn fastened by screws 134 to the undersides of slats in the three different groups of slats. Thus as best seen in FIGS. 7 to 9, the block 132 connected to eccentric 110 is secured to slat $S_5$, the block 132 moving with eccentric 114 is secured to slat $S_3$ and the uppermost block 132 secured to eccentric 112 is mounted to the underside of slat $S_2$. Please note in this connection that as best seen in FIG. 8 the uppermost block 122 has a lateral extension which permits the eccentric 112 to be offset laterally relative to block 132 so that the three eccentrics 110, 112 and 114 can be spaced equally apart along their motor-driven shaft 115.

Similar flexible resilient connections are also provided between the block 122 flexurally connected to each group of slats and the rail corresponding to that slat group. Thus as best seen in FIGS. 7, 9 and 10 a strap 142 is connected at one end by fasteners 144 in the underside of block 122 flexurally connected to the slat group $S_1$, $S_5$. The opposite end of strap 142 is connected by fasteners 146 to a block 148 secured by fasteners 150 to rail $R_1$ at one side of the apparatus. At the other side of the apparatus, the block 122 linked to eccentric 112 is connected to one end of a flexure 142, the other end of which is connected to a block 148 connected to the end of rail $R_3$.

Finally, the block 122 connected to the middle eccentric 114 is flexurally connected to the end of the middle rail $R_3$. In this case, however, the connection is somewhat different from the other two in that it is made near the middle of block 122 where the block is secured by fasteners 154 to one end of a relatively short flexible strap 156. The opposite end of that strap is connected by fasteners 158 to a fixture 160 best seen in FIG. 9. That fixture is, in turn, affixed to the lower end of the L-shaped block 86 connected to the end of rail $R_3$. The fixture 160 is installed in place at the same time the flexure 96 is connected to that block 86 by fasteners 98.

Referring to FIGS. 7 and 8, when each of the eccentrics 110, 112 and 114 is rotated, the reciprocations of the associated push rod 116 cock the corresponding block 122 as shown in dotted lines in FIG. 8. That motion coupled to the corresponding rail and slat group via flexures 124, 156 and 142 respectively together with the motions of the flexures in the associated flexure assembly $F_1$ to $F_3$ cause the corresponding slat group to execute the orbital motion described above and depicted as path E in FIG. 4. Thus the FIG. 7 apparatus embodiment has all of the advantages described above in connection with the FIG. 2 transport apparatus. In addition, however, it is quite compact and is composed of a minimum number of different parts so that it should be quite easy and inexpensive to make.

Equally importantly, when a series of the FIG. 7 transports is incorporated into a process line such as the one shown in FIG. 1, many fewer bellows seals B are required. This results in a considerable cost saving since each seal may cost $200 or more. Thus whereas the FIG. 1 line uses twenty-four seals B (i.e., two layers of twelve each), if FIG. 7 transports are used in that same line, only half that number are required.

Even fewer seals are required if certain modifications are made. More particularly, single phase transports of the FIG. 7 variety, employing only a single group of orbiting slats, can be used in locks $L_1$ and $L_2$. Thus only a single push rod penetrates each lock necesitating only two seals B. The transport in process chamber C being a three phase device requires three bellows seals B. In this arrangement, the same drive section which operates the three phase transport in chamber C is employed to operate the single phase transport in lock $L_1$ simply by coupling the movements one of the push rods to the lock transport. The single phase transport in the exit lock $L_2$ is orbited by coupling to that transport the movements of one of the push rods from the three phase unload transport which is controlled by a separate drive section. Thus a total of only five seals B are required in that process line.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings be interpreted as illustrative and not in a limiting sense.

It is also to be understood that the following claims are intended to cover all the generic and specific features of the invention herein described.

What is claimed as new and desired to be secured by Letters Patent of the United States is:

1. Transport apparatus comprising
   A. mounting means,
   B. first rail means,
   C. means connected to said mounting means for flexurally supporting the rail means relative to the mounting means,
   D. first slat means,
   E. second means connected to the first rail means for flexurally supporting the first slat means relative to the first rail means,
   F. motive means operative to reciprocate said first rail and slat means about their supporting means out of phase with each other so that said first rail means moves along an arcuate path relative to the mounting means and said first slat means moves along an arcuate path relative to the first rail means whereby said first slat means orbits about an elliptical path relative to said mounting means, and
   G. support means positioned adjacent to the first slat means in a plane which intercepts the elliptical path of the first slat means so that when an object is placed on the support means and said motive means is operative, the object is lifted from said support means and advanced relative to the mounting means incrementally along successive paths corresponding to a segment of said elliptical path.

2. The transport defined in claim 1 wherein said elliptical path is highly eccentric so that the object is advanced relative to the mounting means a substantially greater distance than it is lifted from said support means.

3. The transport apparatus defined in claim 1 wherein the motive means comprises
  A. eccentric means,
  B. first linking means linking the eccentric means and the first rail means,
  C. second linking means linking the eccentric means and the first slat means, said first and second linking means being different lengths, and
  D. means for rotating said eccentric means.

4. The transport apparatus defined in claim 1 wherein the support means comprises
  A. second rail, flexural supporting and slat means, all of which are substantially similar to their counterpart first said means, and
  B. second motive means operative to reciprocate the second rail and slat means about their supporting means out of phase relative to one another so that the second rail means moves along an arcuate path relative to the mounting means and the second slat means moves along an arcuate path relative to the second rail means whereby said second slat means orbits about an elliptical path relative to the mounting means, said second motive means also reciprocating the second rail and slat means out of phase with the first rail and slat means so that the object is advanced relative to the mounting means in an incremental fashion alternately by the first and second slat means as they move in their respective orbits.

5. The transport apparatus defined in claim 4 wherein each motive means comprises
  A. an eccentric,
  B. first linking means linking the eccentric and the corresponding rail means,
  C. second linking means linking the eccentric and the corresponding slat means, said first and second linking means being of different lengths, and
  D. means for rotating said eccentric.

6. The transport apparatus defined in claim 4 wherein the second slat means is oriented at an angle relative to the first slat means so that the two slat means intercept whereby an object placed on one slat means can be advanced onto the other slat means so as to change the object's direction of movement.

7. The transport apparatus defined in claim 1 wherein the slat means has a width which varies along its length.

8. The transport apparatus defined in claim 1 wherein
  A. the first flexural support means comprises a first plurality of spaced-apart flexible straps connected between the mounting means and the rail means, and
  B. the second flexural support means comprises a second plurality of spaced-apart flexible straps connected between the rail means and the slat means.

9. The transport apparatus defined in claim 8 wherein all of said straps lie essentially in a straight line.

10. The transport apparatus defined in claim 8 wherein said second plurality of straps in their entireties are located above the first plurality of straps.

11. The transport apparatus defined in claim 8 wherein the second plurality of straps extend below the tops of the plurality of straps.

12. The transport apparatus defined in claim 8 wherein the first and second pluralities of straps are oriented at an angle relative to one another.

13. The transport apparatus defined in claim 1 and further including
  A. a fluid-tight chamber, and
  B. a pair of airlocks at the opposite ends of the chamber beyond the ends of the slat means.

14. The transport apparatus defined in claim 13 and further including
  A. means in the chamber wall permitting access for said motive means to reciprocate the rail and slat means, and
  B. means for flexibly sealing said wall access means.

15. The transport defined in claim 14 wherein the motive means comprises
  A. eccentric means,
  B. means linking the eccentric means to said first rail and slat means, said linking means being flexurally connected to said rail and slat means, and
  C. means to facilitate rotating the eccentric means.

16. Transport apparatus comprising
  A. a stationary support,
  B. a plurality of groups of rails,
  C. a corresponding plurality of groups of first flexures connected between the support and the rail groups for supporting the rail groups above the support,
  D. a plurality of groups of slats defining a track,
  E. a corresponding plurality of groups of second flexures connected between the rail groups and the slat groups for supporting the slat groups above the rail groups, each slat group being connected by said flexures to a different rail group to form a unique slat and rail groups pair, and
  F. means for reciprocating the slat group and rail group comprising each said pair generally parallel to but out of phase with one another so that each point on each slat group orbits about a highly eccentric elliptical path relative to the support, said reciprocating means also reciprocating the different slat and rail group pairs out of phase with one another so that an object positioned on slats belonging to a plurality of slat groups is advanced by those slats in succession incrementally along said track.

17. The transport apparatus defined in claim 16 wherein each of said first flexure comprises
  A. a first flexible strap extending from said support to a rail group, and
  B. each said second flexure comprises a second flexible strap extending from a rail group to a slat group.

18. The transport apparatus defined in claim 17 wherein
  A. each first strap is oriented generally perpendicular to the support, and
  B. each second strap is oriented at an angle relative to said first straps.

19. The transport apparatus defined in claim 17 wherein said first and second straps are arranged more or less in a straight line.

20. The transport apparatus defined in claim 19 wherein said second straps overlap said first straps.

21. The transport apparatus defined in claim 20 wherein said reciprocating means comprises
A. an eccentric for each said rail slat group pair,
B. means linking each eccentric to a said pair, and
C. means for rotating the eccentric.

22. The transport apparatus defined in claim 21 wherein each linking means comprises a push rod
A. pivotally connected at one end to an eccentric, and
B. flexurally connected at its other end to a said pair.

23. The transport apparatus defined in claim 22 wherein said other end of the push rod is connected by a first flexure to the rail group in each said pair and by a second flexure to the slat group in each said pair.

24. The transport apparatus defined in claim 23 wherein said first and second flexures connected to said push rod have different lengths.

25. The transport apparatus defined in claim 24 wherein the second flexure connected to the push rod is spaced above the first flexure connected to the push rod.

* * * * *